UNITED STATES PATENT OFFICE.

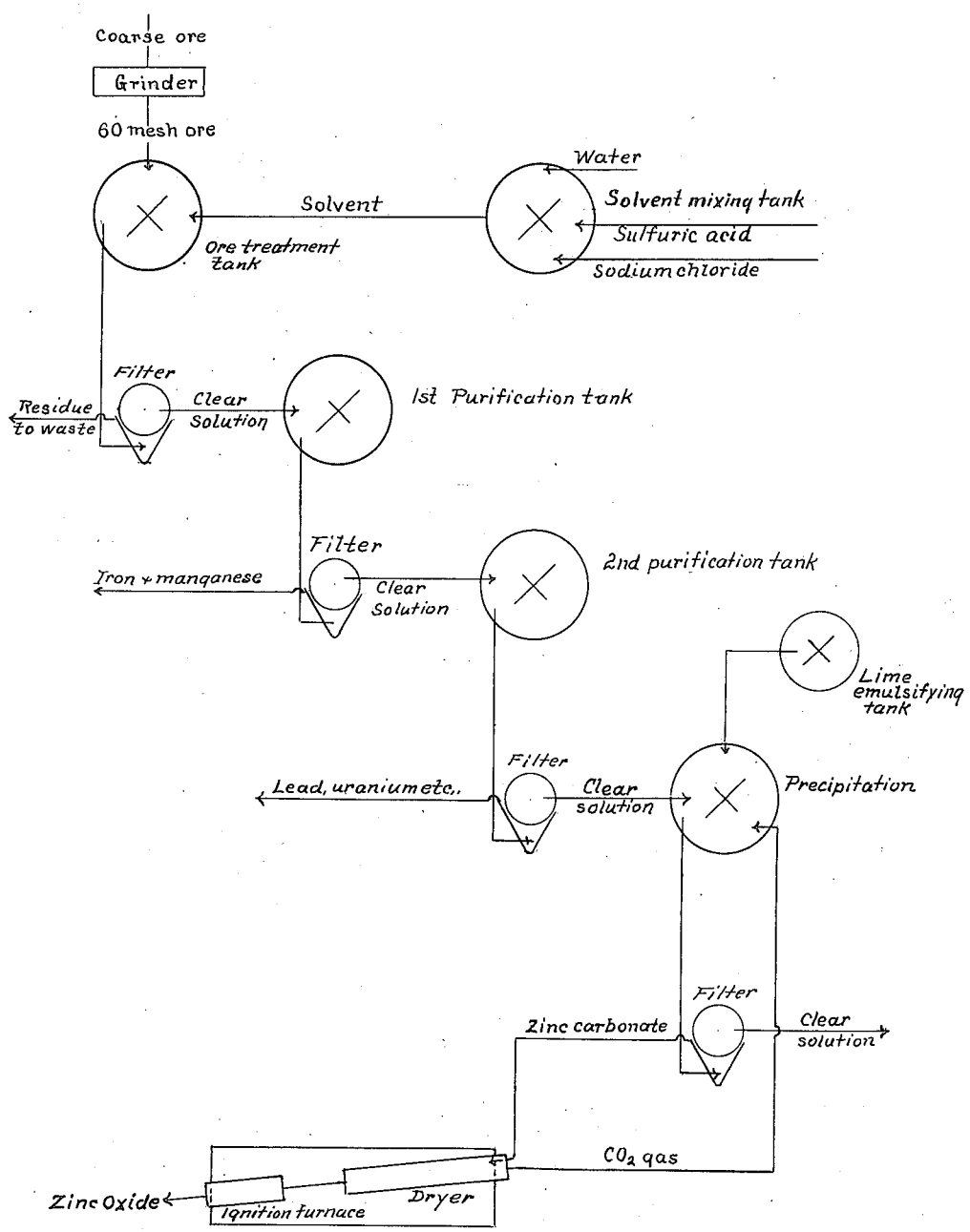

JOHN ALLINGHAM, OF LOS ANGELES, CALIFORNIA.

PROCESS FOR THE MANUFACTURE OF ZINC OXID DIRECT FROM OXIDIZED ZINC ORES.

1,380,514. Specification of Letters Patent. Patented June 7, 1921.

Application filed November 4, 1919. Serial No. 335,612.

*To all whom it may concern:*

Be it known that I, JOHN ALLINGHAM, a subject of the King of Great Britain and Ireland, and a resident of Los Angeles, in the county of Los Angeles, State of California, have invented a new and useful Process for the Manufacture of Zinc Oxid Direct from Oxidized Zinc Ores, of which the following is a specification.

The main object of the present invention is to produce zinc oxid substantially pure and white, directly from oxidized ores of zinc. Such oxidized ores may consist of the product of roasting zinc blende ore in the usual manner, or may be naturally occurring oxidized ores.

My process comprises the leaching of the zinc from the oxidized ore with a suitable solvent (namely, sulfuric acid and sodium chlorid solution), purifying the resulting solution, precipitating the zinc as hydroxid and converting the hydroxid to carbonate, in the manner hereinafter set forth.

The accompanying drawing is a flow sheet of the preferred method of carrying out my invention.

The ore is ground to pass 60 mesh, or such mesh as will give the most economical result, and is then agitated (in a tank provided with a mechanical stirrer) with the solvent. This solvent is a mixture of water, sulfuric acid and salt and is previously prepared. The amount of sulfuric acid and salt varies according to the amount of zinc and of lime present in the ore, but in practice, with ore containing about 25% of Zn and from 15 to 20% of CaO, I used per ton of ore about one thousand pounds of sulfuric acid, about twelve hundred pounds of sodium chlorid and three to four tons of water.

After solution of the zinc has taken place, care being taken that there is practically no free acid left, the pulp is filtered through any standard filter suitable for the purpose, and the resulting residue is washed with water to displace any solution contained therein.

In mixing the solvent above referred to, reaction takes place as follows:—

$$H_2SO_4 + 2NaCl = Na_2SO_4 + 2HCl$$

so that the solution contains sodium sulfate and hydrochloric acid.

Any lime dissolved as chlorid is precipitated as calcium sulfate by the sodium sulfate present, according to the equation:—

$$CaCl_2 + Na_2SO_4 = 2NaCl + CaSO_4$$

therefore it is necessary that the zinc and lime content should be adjusted so that the lime dissolved should be sufficient to react with the sodium sulfate formed within practical limits.

The resulting filtered solution is then treated hot with bleaching powder to remove such impurities as iron and manganese, and again filtered.

Again the filtered solution is treated with finely ground barium carbonate and zinc dust to remove lead uranium, etc.

After such treatment the solution is again filtered and treated with an emulsion of burnt lime, the amount necessary depending upon the zinc content, the equation of reaction being:—

$$ZnCl_2 + Ca(OH)_2 = CaCl_2 + Zn(OH)_2$$

after such precipitation, the solution and precipitate is subjected to the action of carbon dioxid, this gas being obtained from the cooled gases resulting from the drying and ignition furnaces, the reaction proceeding according to the equation:—

$$Zn(OH)_2 + CO_2 = ZnCO_3 + H_2O$$

The filtration of the solution is performed in standard filtering apparatus and the gas treatment in any form of washer suitable for the purpose.

The zinc carbonate is filtered off, dried and ignited, to zinc oxid, and the carbon dioxid gas resulting from this ignition returned to the precipitating operation, as above described.

By converting the zinc hydroxid to carbonate, as above described, I produce the zinc oxid in pure white condition after ignition, and avoid the production of a yellow product such as is liable to result from ignition of the hydroxid.

What I claim is:

The process of making zinc oxid direct from oxidized ores, which consists in subjecting such ore to the solvent action of a solution of sulfuric acid and sodium chlorid, separating the resulting solution from the residue, treating the solution to remove compounds of metals other than zinc, treating the solution with calcium hydroxid to precipitate zinc as hydroxid, subjecting the resulting precipitate in the presence of the solution to the action of carbon dioxid to produce zinc carbonate, separating the zinc carbonate from the solution, and drying and igniting the zinc carbonate.

In testimony whereof I have hereunto subscribed my name this 21st day of October, 1919.

JOHN ALLINGHAM